July 2, 1946.   H. C. GRAEBE   2,403,175
LATHE ADAPTER
Filed July 9, 1943   2 Sheets-Sheet 1

Inventor
Herman C. Graebe
By C. E. Herrstrom & W. E. Thibodeau
Attorneys

July 2, 1946.                H. C. GRAEBE                2,403,175
                              LATHE ADAPTER
              Filed July 9, 1943                  2 Sheets-Sheet 2
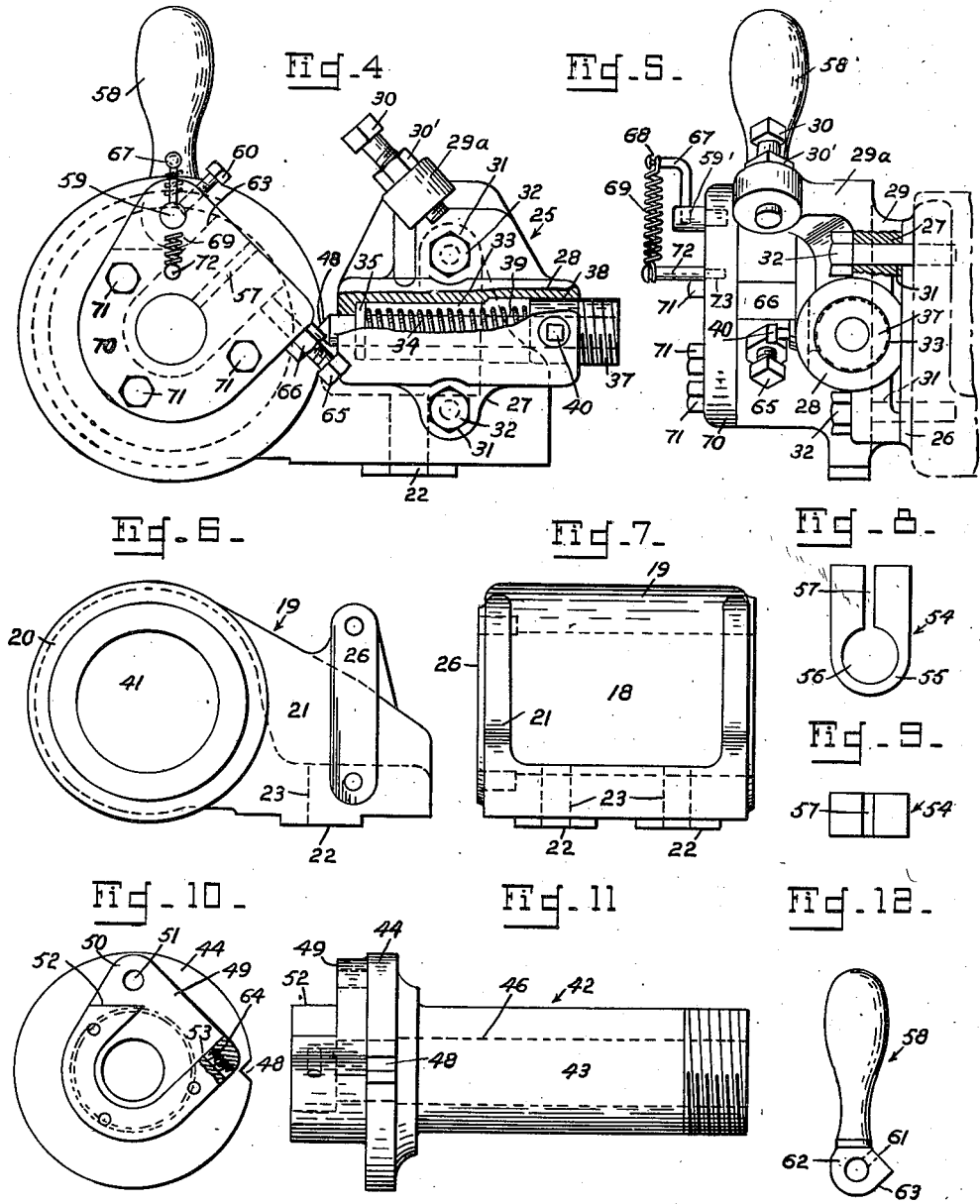
Inventor
Herman C. Graebe
By C.E. Herrstrom & H.E. Thibodeau
Attorneys Patented July 2, 1946

2,403,175

UNITED STATES PATENT OFFICE 2,403,175

LATHE ADAPTER

Herman C. Graebe, Bridgewater, Mass., assignor to Carver Cotton Gin Company, Division of The Murray Company, East Bridgewater, Mass., a corporation of Texas Application July 9, 1943, Serial No. 494,057

4 Claims. (Cl. 77—3)

This invention relates to an apparatus for converting lathes of comparatively short length of bed to perform deep hole drilling.

The drilling of deep holes in any object, and especially gun barrel tubes, is generally performed on special boring equipment. Such equipment is provided with a long bed to accommodate the full rearward travel of the boring bar as it is withdrawn after completion of the drilling to clear the end of the workpiece. Further, specialized boring equipment is generally provided with rather complicated electrical devices for the operations of feeding and retracting the boring mechanism. In addition electrically controlled safety devices are provided to prevent breakage of the drill.

For the small shop which cannot afford to procure such equipment or even when the procurement of specialized boring machinery is not feasible due to the stress of wartimes, it becomes necessary to utilize existing equipment. There are frequently found in such small shops lathes having a comparatively short bed that can conveniently accommodate the long gun barrel yet would not permit full travel of the carriage for drilling the bore in one continuous operation. If such lathes could be adapted to bore long tubular members, such as a gun barrel, considerable additional work could be undertaken with existing equipment.

Accordingly it is an object of this invention to provide a lathe adapter for converting a lathe having a comparatively short bed to permit deep hole drilling by advancing the drill into the workpiece by steps.

Another object of this invention is to provide an oil coupling for the boring bar of a lathe adapter for lubrication and for washing away such chips as are formed by the drilling.

A particular object of this invention is to provide a lathe adapter having a mechanical safety device to prevent damage to a deep hole drill.

The specific nature of the invention as well as other objects and advantages thereof will clearly appear from a description of a preferred embodiment as shown in the accompanying drawings in which:

Fig. 4 is an enlarged left end view of the safety device as viewed in Fig. 2 shown partly in section.

Fig. 5 is an enlarged front elevational view of the safety device.

Fig. 6 is an enlarged end elevational view of the safety device bracket.

Fig. 7 is a right side elevational view of Fig. 6.

Fig. 8 is a top elevational view of the clamp.

Fig. 9 is a top end elevational view of Fig. 8.

Fig. 10 is a left end elevational view of the clamp holder as viewed in Fig. 2.

Fig. 11 is a side elevational view of Fig. 10.

Fig. 12 is a top elevational view of the clamp holder lever showing the eccentric lug on one end thereof.

This invention utilizes conventional lathe equipment for deep hole drilling and employs a drill clamping device which can be mounted on the carriage of the lathe and may be adjusted to clamp the drill in any position desired. For example, after the boring has progressed a short distance into a barrel tube the boring may be stopped, the device unclamped and the drill engaged in a new position so that the boring may progress to a greater depth. In this manner a lathe having a comparatively short bed may be readily utilized.

A simple mechanical safety to prevent injury to the drill is also provided on the drill clamping device which will immediately unclamp the drill and permit it to rotate with the barrel tube in the event the drill sticks within the bore.

Figure 1:
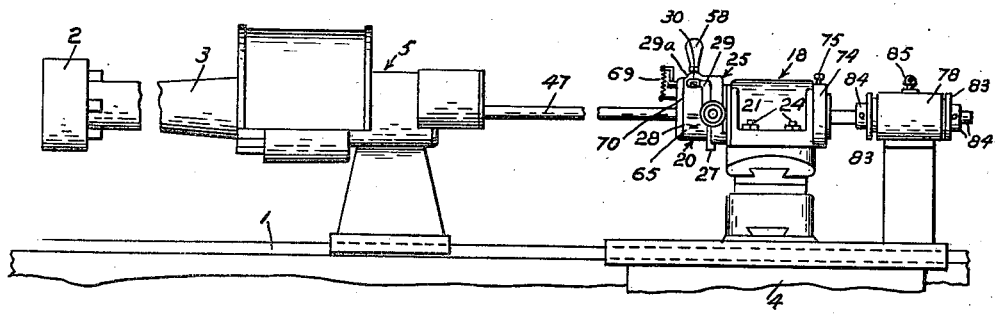
Fig. 1 is a front elevational view showing the adapter mounted on the bed of a lathe.

There is shown in Fig. 1 a portion of a conventional lathe bed 1 on which is mounted the adapter for deep hole drilling. It is desired to point out that the adapter to be described herein may be utilized for deep hole drilling in any object which can be mounted in the lathe. A gun tube of a comparatively large caliber gun is one example where deep hole drilling must be utilized and will serve to illustrate the manner in which this attachment can be utilized. In most deep hole drilling operations the drill is held stationary while the gun tube is revolved and the drill is advanced into the work. Accordingly a chuck 2 conventionally mounted on the headstock of the lathe (not shown) is utilized to drive a gun tube 3 while drilling the hole.

The conventional carriage 4 of the lathe as well as the traversing mechanism is also utilized. A live end rest 5 (Figs. 1 and 3) is provided and is mounted on the ways of the lathe bed 1 between the headstock 2 and the carriage 4. The end rest 5 comprises a bearing support 6 in which is rotatably mounted a "cat's head" or rotating end support 7. The bearing support 6 comprises a base 8 and a cylindrical head 9. An axial hole 10 is provided in the cylindrical head 9 in which the "cat's head" 7 is inserted. The "cat's head" 7 comprises a hollow cylindrical head portion 11, and an integral spindle 12. A axial hole 13 is provided in spindle 12. The end of hole 13 in spindle 12 adjacent the hollow cylindrical head 11 is counterbored slightly to receive a flanged bushing 14. Bushing 14 is secured to the interior of head 11 by a pin 15 to prevent rotation thereof. An axial hole 16 is provided in bushing 14 which serves to guide a drill which is to be described. Four equally spaced adjusting screws 17 are provided about the periphery of the head 11.

A rod carrier 18 (Figs. 1 and 2) is mounted on top of the compound rest of carriage 4 in place of the usual tool post. The carrier 18 comprises a bracket 19 (Figs. 6 and 7) to which is secured the safety device and clamping mechanism to be described. Bracket 19 comprises a horizontal cylindrical head 20 and an integral U-shaped support 21. On the bottom of support 21 integral lugs 22 are provided for mounting the bracket 19 on top of the compound rest of the carriage. Two suitable holes 23 are provided in the base of the U-shaped support 21 in which two bolts 24 are inserted to secure bracket 19 to the compound rest in place of the tool post holder.

Figure 2:
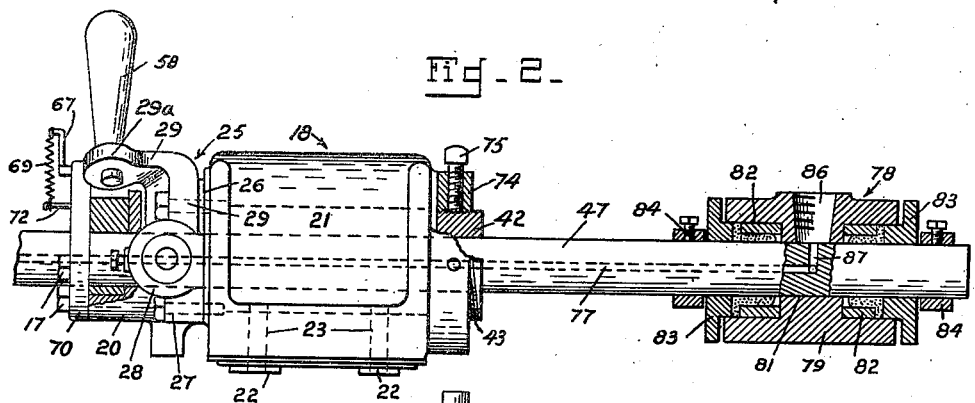
Fig. 2 is an enlarged view showing the oil coupling in longitudinal section mounted on the end of the boring bar and also the safety device shown partly in longitudinal section.

A release pin bracket 25 is bolted to an integral upright lug 26 provided on the left arm of the U-shaped support 21 as viewed in Fig. 2. The bracket 25 (Figs. 2, 4 and 5) comprises a base 27 and an integral cylindrical portion 28 in the center thereof. An arm 29 projects outwardly from the base 27. An integral lug 29a is provided on the end of arm 29 and is disposed at an angle to the arm 29 as shown in Figs. 4 and 5. An adjustable stop 30 which comprises a bolt and lock nut 30' is screwed into a suitably threaded hole in the lug 29a. Two holes 31 are provided in base 27 so that bolts 32 may be inserted therein and screwed into suitably threaded holes in the lug 26 to secure the bracket 25 to the bracket 19. Thus when bracket 25 is mounted on bracket 19 the cylindrical portion 28 of the bracket 25 will be in a horizontal position and the arm 29 will project upwardly over the cylindrical portion 28. An axial counterbored hole 33 is provided in cylindrical portion 28 of bracket 25 in which is inserted a plunger 34. Plunger 34 is provided with an integral flange 35 on the inner end thereof, said flange abutting the bottom of counterbored hole 33, the inner end portion of plunger 34 projecting through hole 33 slightly beyond the face of the end of cylindrical portion 28 and being preferably wedge-shaped. A nut 37 is screwed into the threaded counterbored end 38 of hole 33 to retain a spring 39 therein. A set screw 40 is provided through the cylindrical portion 28 which bears against the nut 37 to prevent nut 37 from being displaced.

An axial hole 41 (Fig. 6) is provided in the cylindrical head 20 of bracket 19 to receive a clamp holder 42 (Fig. 11). The clamp holder 42 comprises a tubular portion 43 having a cylindrical head 44 on one end. The other end of the tubular portion 43 is threaded to receive a nut 74 (Fig. 2). An axial hole 46 is provided in the clamp holder 42 to receive a drill rod 47 (Fig. 2). A V-shaped notch 48 corresponding to the wedge-shaped end of plunger 34 is provided on the outer surface of the cylindrical head 44 of clamp holder 42. An integral lug 49 is provided on the face of the cylindrical head 44. Lug 49 is substantially rectangular in form but is provided with one rounded end concentric with the axis of the axial hole 46. One corner 50 in lug 49 is located on the vertical axis of the clamp holder 42 as shown in Fig. 10. A hole 51 is provided in the corner 50 of the lug 49. The lug 49 is also cut away as shown in Fig. 10 to form a shoulder 52. A circular end mill cut is made on the face of lug 49 to form an oblique slot 53 as shown in Fig. 10 which extends to the center of hole 46.

Clamp holder 42 is inserted in the axial hole 41 of bracket 19 in such fashion that V-shaped notch 48 will be opposite the release plunger 34 supported in bracket 25. A clamp 54 (Figs. 8 and 9) is inserted in the slot 53 of clamp holder 42. Clamp 54 is a rectangular member provided with a rounded end 55 to fit the end of slot 53. A transverse hole 56 connected with a longitudinal slot 57 is provided for clamping the drill rod 47.

A lever 58 is pivotally mounted on the upper corner of lug 49 by a pin 59 inserted through a suitable hole in lever 58 and into hole 51. A set screw 60 inserted in threaded hole 61 in the hub 62 of lever 58 bears against a suitable flat portion on pin 59 and securely locks lever 58 to pin 59. The hub 62 of lever 58 is generally rounded but includes an eccentric surface portion 63. The eccentric surface 63 bears against the side of clamp 54 when lever 58 is pivoted in a clockwise direction as viewed in Fig. 4 to tighten clamp 54 about the drill 47.

In the lower corner of lug 49 a threaded hole 64 is provided in which is inserted an adjusting bolt 65. A lock nut 66 is provided on bolt 65 to lock bolt 65 in any desired position. A bent pin 67 is inserted in a suitable vertical hole in lever pin 59'. An annular groove 68 is provided in the bent portion of pin 67 to receive one end of spring 69. A cover 70 of the same configuration as lug 49 is placed on top of lug 49 to retain clamp 54 and lever 58 in their respective positions. Cover 70 is secured to lug 49 by three bolts 71. The lower end of spring 69 is secured to a screw 72 inserted in a threaded hole 73 in cover 70. A circular nut 74 is screwed on to the threaded end of clamp holder 42 and is locked thereon by a bolt 75 inserted through a suitably threaded hole in nut 74 and screwed into engagement with the threaded end portion of clamp holder 42.

Figure 3:
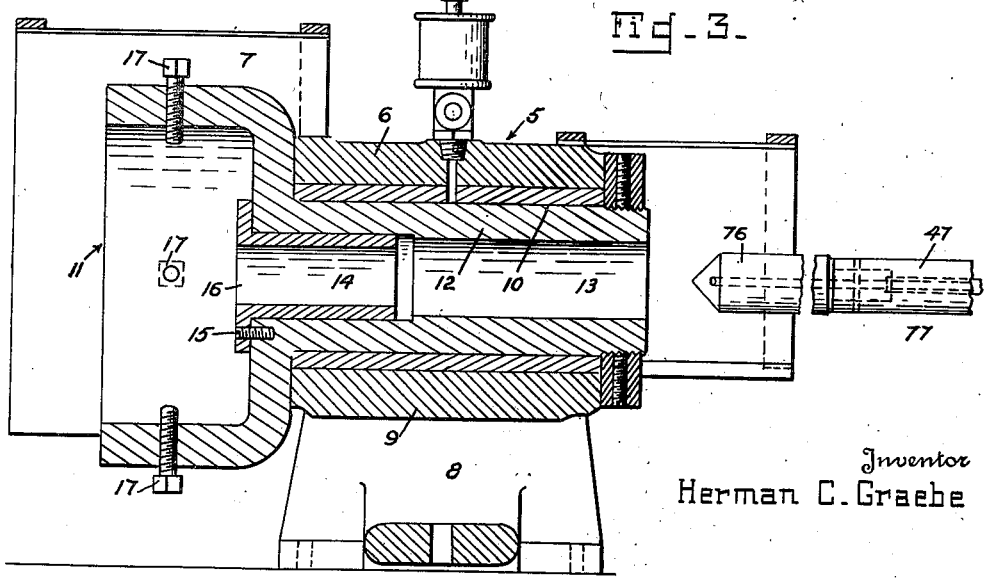
Fig. 3 is an enlarged longitudinal sectional view of the cat's head or rotating end support.

The drill rod 57 utilized is a conventional single lip drill used for deep hole boring and comprises a single lip boring bit 76 and a boring bar 47 (Fig. 3). An axial hole 77 is provided in boring bar and bit so that oil under pressure may be forced to the cutting end of drill 76 for lubrication and also to wash chips out of the hole being bored so that the drill will not bind in the bore. An oil coupling 78 is provided on end of bar 47. Coupling 78 comprises a circular cylindrical casting 79 which is provided with an axial hole 81 so that the coupling may be slipped over the end of boring bar 47. The hole 81 is suitably counterbored at each end to receive oil tight packings 82 and bushings 83 respectively. The coupling 78 is held in position on the end of boring bar 47 by two collars 84 suitably secured to bar 47 placed adjacent each bushing 83. A suitable oil tight fitting 85 (Fig. 1) is inserted in a centrally located radial hole 86 in coupling 78 and connects to the lubricating oil source (not shown). Hole 86 is placed over another radial hole 87 in boring bar 47 which connects with axial hole 77.

To drill the bore of gun tube 3 one end is inserted in chuck 2 in the headstock of the lathe. The other end of tube 3 is inserted in the hollow head of the cat's head and centrally secured therein by the set screws 17. The jaws of chuck 2 are then tightened after centering the tube within the cat's head 7. Drill 47 is next inserted in the tubular portion 43 of clamp holder 42 and lever 58 is pivoted in a clockwise direction so that the eccentric surface 63 will bear against clamp 54 thus securely holding boring bar 47 against rotation within the clamp holder. If desired a lathe steady rest can be placed around the forward end of boring bar 47 to provide additional support for boring bar 47 before and during drilling.

Carriage 4 is then traversed along the bed 1 of the lathe until the end of drill 76 passes through bushing 14 and engages the end of gun tube 3. Oil is supplied through fitting 85 so that oil will pass through the axial hole 77 in drill rod 47 for lubricating drill point 76. The driving chuck 2 is then set in motion to revolve gun tube 3. The drill rod 47 is advanced into the work by the carriage 4, which is driven by the feed screw of the lathe. Drill 76 then continues to cut as long as the carriage is permitted to advance along the lathe bed 1.

It is desired to point out that the drill rod carrier may be clamped about rod 47 in any desired position, thus enabling a lathe bed of comparatively short length to be utilized. For example, the drill rod carrier may be clamped approximately midway about drill rod 47 and the drill allowed to advance into the gun tube for this distance whereupon the lathe is stopped. The drill rod is unclamped and the carrier moved back so that the drill may be clamped near its end. The carriage 4 is then re-engaged to the feed screw and the drill permitted to cut to its full depth. It should be understood that the drill rod may be clamped in any intermediate position.

As previously mentioned the drill rod is mainly supported by the clamp holder. Additional support is furnished the drill rod 47 as it is brought into work engagement with the gun tube by the bushing 14 in the cat's head. As the drill progresses into the tube the drill 76 loses the support of bushing 14. However, the drill is supported by the walls of the hole as the drill cuts its own path.

On occasion when a hard spot in the core of the gun tube is encountered by the drill the drill point will frequently freeze therein and unless some means is provided to permit the drill to unclamp and rotate with the workpiece the tremendous torque produced will cause the drill to break off. This is overcome by the mechanical safety device already described which comprises the plunger 34 and the eccentric lever 58. Under normal operating conditions spring biased plunger 34 which is in engagement with the V-shaped notch 48 in clamp holder 42 will securely hold the boring bar 47 against rotation. However when the torque on boring bar 47 exceeds the normal boring torque due to freezing of the drill, the spring biased plunger 34 will be forced out of engagement with the V-shaped notch 48 in the clamp holder 42 and the clamp holder and boring bar together will be rotated approximately one-quarter of a turn in a clockwise direction as viewed in Fig. 5, assisted by spring 69, until lever 58 strikes the adjustable stop 30.

Such movement will bring eccentric surface 63 of lever 58 out of camming engagement with clamp 54 and thus unclamp boring bar 47. The drill will then rotate with gun tube 3 within clamp holder 42 thus preventing breakage of the drill. The machine can then be stopped as soon as this condition is noted and the drill freed from the gun tube.

It is apparent from the foregoing description that with this attachment lathes of comparatively short length of bed may be readily utilized for deep hole drilling. Furthermore in view of the mechanical safety device which eliminates breakage of the drill conventional lathe equipment may be readily utilized without the addition of complicated elctrical devices for the purposes of stopping the machine when the drill is frozen due to striking some obstruction in the bore.

I claim:

1. For use in a machine tool having a longitudinal bed, a tool holder comprising a bearing bracket arranged to be mounted on the bed of the machine tool, a hollow bushing rotatably mounted in said bearing bracket and arranged to surround a tool shank, a clamp secured on said bushing and arranged to engage the tool shank, an operating member movably mounted on said bushing and engageable with said clamp to tighten said clamp on the tool shank whereby the bushing may be rigidly secured to the tool shank, means for securing said bushing to said bearing bracket against relative rotation, means for releasing said last mentioned means operative upon application of a predetermined torque between said bushing and said bearing bracket, thereby producing rotation of said bushing relative to said bearing bracket, and a stop engageable by said operating member during such rotation of said bushing whereby said operating member is moved to a released position relative to said clamp.

2. For use in a machine tool having a longitudinal bed, a tool holder comprising a bearing bracket arranged to be mounted on the bed of the machine tool, a hollow bushing rotatably mounted in said bearing bracket and arranged to surround a tool shank, a split clamp secured on said bushing and arranged to engage the tool shank, a manually operated cam member movably mounted on said bushing and engageable with said split clamp to tighten said split clamp on the tool shank whereby the bushing may be rigidly secured to the tool shank, means for securing said bushing to said bearing bracket against relative rotation, means for releasing said last mentioned means operative upon application of a predetermined torque between said bushing and bearing bracket thereby producing rotation of said bushing relative to said bearing bracket, and a stop engageable by said cam member during such rotation of said bushing whereby said cam member is moved to a released position relative to said clamp.

3. For use in a machine tool having a longitudinal bed, a tool holder comprising a bearing bracket arranged to be mounted on the bed of the machine tool, a hollow bushing rotatably mounted in said bearing bracket and arranged to surround a tool shank, said bushing having a recess in a peripheral edge portion thereof, a clamp secured on said bushing and arranged to engage the tool shank, an operating member movably mounted on said bushing and engageable with said clamp to tighten said clamp on the tool shank whereby the bushing may be rigidly secured to the tool shank, a spring pressed plunger mounted in said bracket, said plunger having a cam shaped end engageable in said recess for securing said bushing to said bearing bracket against relative rotation, said cam shaped end being constructed and arranged relative to the walls of said recess whereby a predetermined torque between said bushing and said bearing bracket forces said plunger out of engagement with said recess permitting said bushing to rotate relative to said bearing bracket, and a stop engageable by said operating member during such rotation of said bushing whereby said operating member is moved to a released position relative to said clamp.

4. For use in a machine tool having a longitudinal bed, a tool holder comprising a bearing bracket arranged to be mounted on the bed of the machine tool, a hollow bushing rotatably mounted in said bearing bracket and arranged to surround a tool shank, said bushing having a recess in a peripheral edge portion thereof, a split clamp secured on said bushing and arranged to engage the tool shank, a manually operated cam member movably mounted on said bushing and engageable with said split clamp to tighten said split clamp on the tool shank whereby the bushing may be rigidly secured to the tool shank, a spring pressed plunger mounted in said bracket, said plunger having a cam shaped end engageable in said recess for securing said bushing to said bearing bracket against relative rotation, said cam shaped end being constructed and arranged relative to the walls of said recess whereby a predetermined torque between said bushing and said bearing bracket forces said plunger out of engagement with said recess permitting said bushing to rotate relative to said bearing bracket, and a stop engageable by said cam member during such rotation of said bushing whereby said cam member is moved to a released position relative to said clamp.

HERMAN C. GRAEBE.